June 18, 1963 — J. E. JENDRISAK — 3,094,403
GLASS SHEET BENDING MOLD
Original Filed June 14, 1951 — 3 Sheets-Sheet 1

Inventor
Joseph E. Jendrisak
By Nobbe & Swope
Attorneys

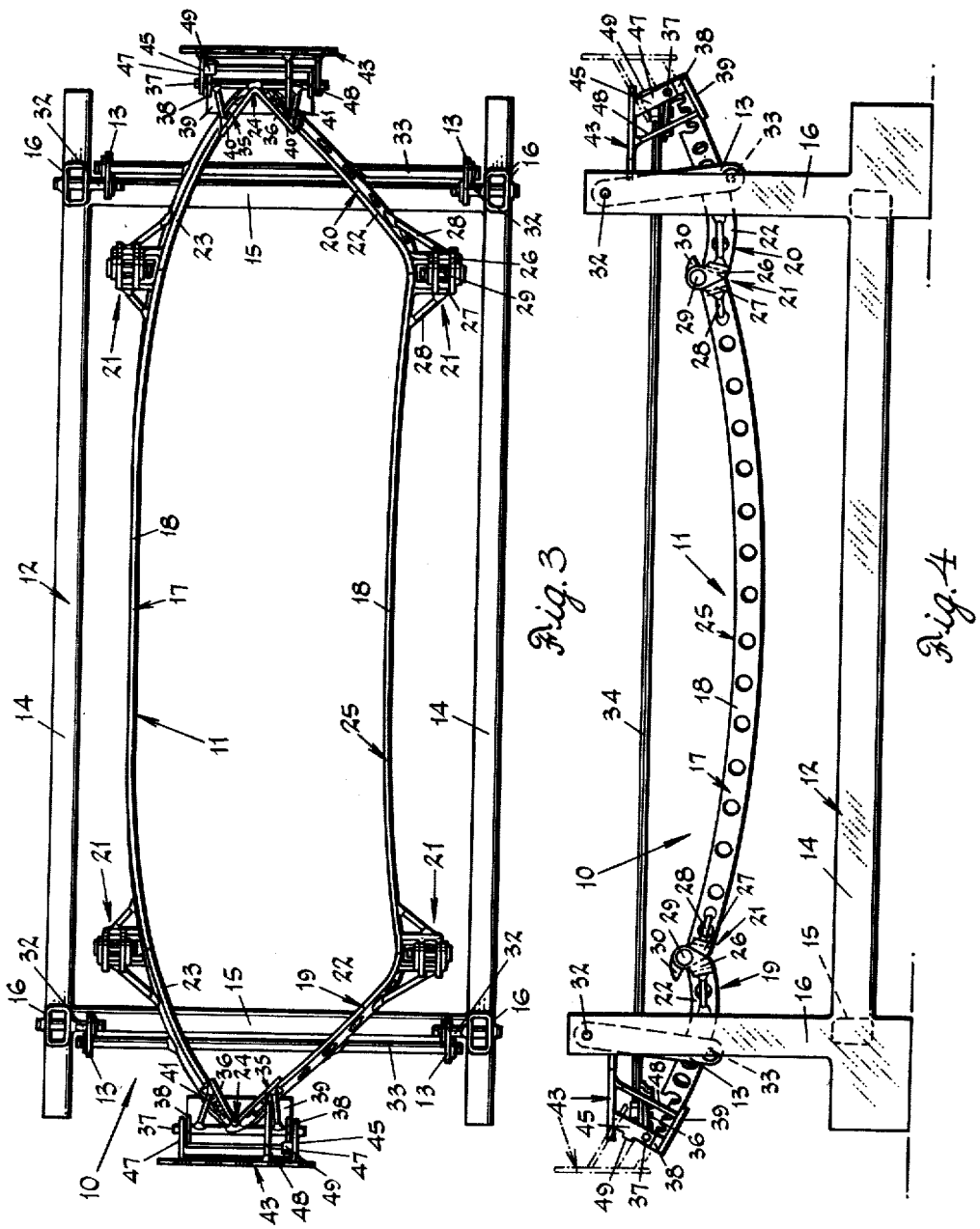

June 18, 1963   J. E. JENDRISAK   3,094,403
GLASS SHEET BENDING MOLD
Original Filed June 14, 1951   3 Sheets-Sheet 3

Inventor
Joseph E. Jendrisak
By Nobbe & Swope
Attorneys

United States Patent Office 3,094,403
Patented June 18, 1963

3,094,403
GLASS SHEET BENDING MOLD
Joseph E. Jendrisak, Northville, Mich., assignor to Libbey-Owens-Ford Glass Company, Toledo, Ohio, a corporation of Ohio
Continuation of application Ser. No. 231,575, June 14, 1951. This application Apr. 19, 1956, Ser. No. 579,272
17 Claims. (Cl. 65—288)

The present invention relates broadly to the bending of sheets or plates of glass or like materials.

This application is a continuation of my copending application Serial No. 231,575, filed June 14, 1951 (now abandoned).

Generally stated, this invention is concerned with the bending of glass sheets into curvatures embodying a shallow concave central area and end areas which curve rather sharply upward from said central area. Because of the severity and depth of these bends, they must be formed from an initial length of flat glass that is materially greater than the overall length of the finally bent sheet.

Heretofore, in the bending of glass, it has become customary to support the flat sheet to be bent at its opposite ends only, and to then heat the sheet in a furnace until it settles freely, upon softening, into conformity with the shaping surface of the mold. This procedure has been employed to advantage in bending relatively short and/or thin glass sheets in matched pairs, which subsequently were assembled with a thermoplastic interlayer, to produce a laminated unit.

Now, however, in producing the severe type bends contemplated here, it has been found that prior known ways of supporting the sheets to be bent are not satisfactory. This is due primarily to the fact that, because of the ratio of the flat to the bent length of the sheets, they cannot readily settle into conformity with the mold. Consequently attempts to produce such bends with the methods and equipment of the prior art results in inaccurate bends or breaking of the glass.

It is therefore an aim of the present invention to provide an improved method and apparatus by which flat sheets of glass of relatively large dimensions and/or thin character can be readily and satisfactorily bent to severe curvatures of considerable depth.

A further object is the provision of an improved glass bending apparatus, including a hinged bending mold in which a novel balanced relation of the hinged mold sections is employed to initially support flat sheets or plates of glass to be bent and to subsequently carry them into conformity with the shaping surface of the mold.

Another object of the invention is to provide, in apparatus of the above character, an improved outline or ring type mold which is composed of hingedly related sections that are so suspended that they can be oriented into a balanced open position to receive and support sheets of glass when flat, and to subsequently overcome the effected balance so as to bend the ends of the glass sheets into conformity with the shaping surface at the end of the bending operation.

Another object is the provision of an outline or ring type mold having a central section and end sections hingedly connected together, with the end sections being suspended in balanced relation so that they may be sustained in the open mold position by sheets of glass when flat, and subsequently influenced by the gravitational movement of the mold toward its closed position to carry the glass sheets into bent conformity with the mold shaping surface.

Still another object is to provide a bending apparatus of the above general character which includes an outline or ring type mold and a supporting frame from which the mold is suspended, the mold being formed of hingedly related sections that are adapted to be balanced in an open position of the mold and sustained by sheets of glass supported thereon when flat, the suspension means of the frame and the balanced relation of the mold sections thereon being operable while simultaneously closing said mold sections to present a continuous shaping surface to the glass sheets to carry said sheets into conformity with the said shaping surface.

Other objects and advantages of the invention will become more apparent during the course of the following description when taken in connection with the accompanying drawings.

In the drawings, wherein like numerals are employed to designate like parts throughout the same:

FIG. 3 is a plan view of the bending apparatus showing the hinged sections of the mold in their open position;

FIG. 4 is a side elevation of the bending apparatus showing the mold sections positioned as shown in FIG. 3;

Figures 1, 2:
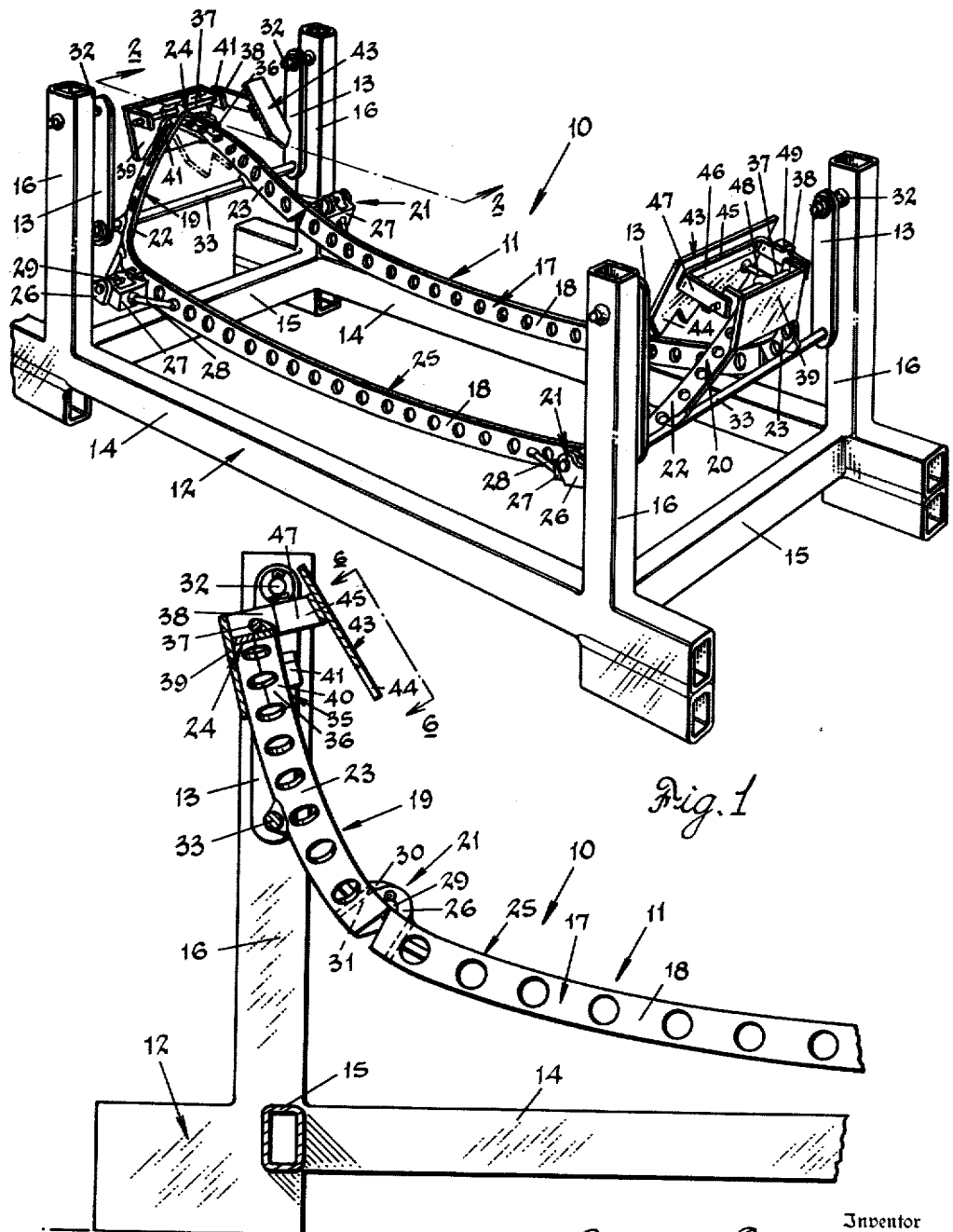
FIG. 1 is a perspective view of a bending apparatus constructed in accordance with the invention.
FIG. 2 is a vertical, longitudinal section through one end of the bending apparatus, taken substantially along line 2—2 in FIG. 1.
Figure 5:
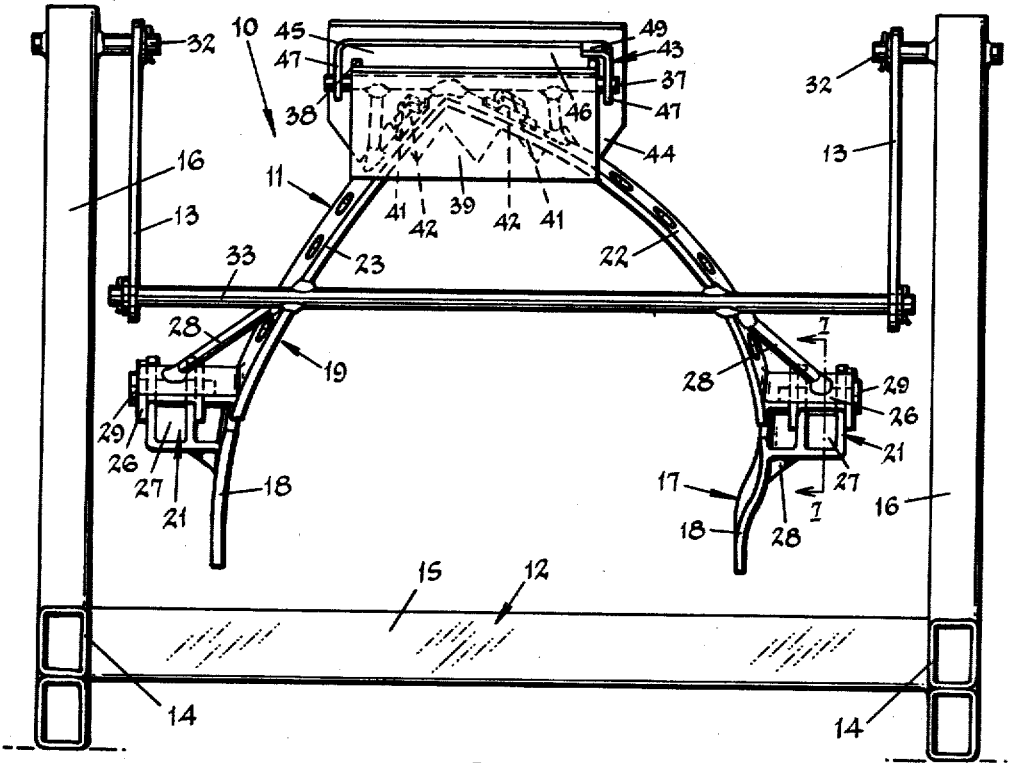
FIG. 5 is an end elevation of the bending mold.

Referring now more particularly to the drawings, there has been illustrated in FIG. 1, an improved bending apparatus, constructed in accordance with the invention and which is designated in its entirety by the numeral 10. The bending apparatus 10 comprises an outline, peripheral or ring mold 11 that is carried on a supporting rack or frame 12 by means of links arranged adjacent the four corners of the apparatus.

The rack 12 is generally rectangular in plan and includes side members 14 arranged in parallel and transversely disposed cross members 15. Equidistantly spaced from the ends of the side members 14 are vertically disposed posts 16 on which the links 13 are carried in a manner to be more fully hereinafter described.

According to this invention, a novel manner of mold support is employed to control the influence of the mold weight upon the glass and, throughout the bending operation, to increase such influence in accord with the settling of the glass sheets onto the mold or the shaping surfaces formed thereon. As herein provided, the mold 11 comprises hingedly related center and end sections and it is supported in the bending apparatus by connection of the links 13 with the end mold sections. The mold thus includes a central section 17, formed by suitably contoured rails 18, and end sections 19 and 20 that are hingedly connected to the central section 17, at their adjoining ends, by means of hinges generally indicated at 21. The end mold sections 19 and 20 are freely movable with reference to the central section 17 from the closed position shown in FIG. 1 to an open position substantially as shown in FIGS. 3 and 4. In elevation, and with the mold in closed position as shown in FIGS. 1 and 2, these end mold sections are formed by rails 22 and 23 which rise sharply from the shallow concave curvature of the central section rails 18, and the points of hinged connection to said rails 18 are preferably disposed within the areas of smallest or sharpest curvature.

In plan, the rails 22 and 23 of each of the end sections 19 and 20 are arranged so as to converge toward one another in substantially a wedge shape, the apex 24 of which, as best shown in FIG. 3, is neither necessarily in alignment with the normal axis of the mold 11, nor formed of rail members that have an identical curvature. In fact, the relative location of the apex 24 and the individual curvatures of the rail members 22 and 23 will be determined by the shape and curvature desired in the bent glass sheet, and may be altered to meet the desired conditions within the spirit of the invention. However, the bend contour in elevation will always necessitate the contour of the upper surfaces of the mold sections 17, 19 and 20 being in the nature of a compound curve approaching, in some instances, the resemblance of a broadened U in shape.

In any event, regardless of variations in its specific shape and contour, the mold 11, formed by the sections 17, 19 and 20, is adapted to bend a sheet of glass, having a considerable length, into a bent formation of which the chord distance between the apices 24 or extreme ends of the sections 19 and 20 will be materially shorter than the overall length of the sheet in the flat, and when the said sections of the mold are disposed in their closed positions, their upper surfaces constitute the shaping surface 25 of the mold, and against which the glass sheets are bent.

Figures 6, 7:
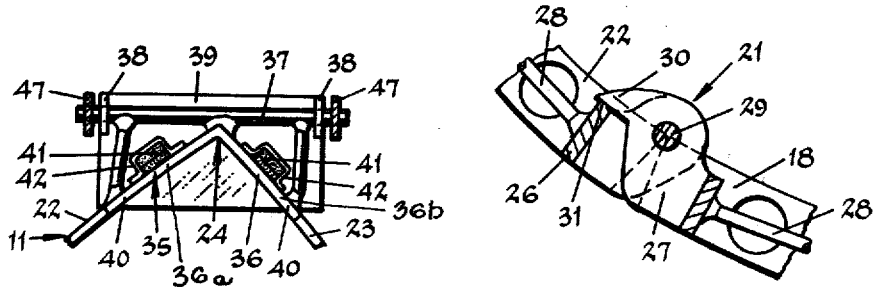
FIG. 6 is a view at one end of the mold looking in the direction of arrows 6—6 of FIG. 2, and showing the mold locators in detail.
FIG. 7 is an enlarged, fragmentary, sectional, detail view of one of the hinges for the mold taken substantially along the line 7—7 of FIG. 5.

The hinges 21 which interconnect the respective sections of the mold 11 are formed by U-shaped members 26 and 27 which may be fixedly secured to the adjoining ends of the rails 18, 22 and 23 and suitably reenforced by braces 28. Preferably the members 26 are spaced apart to receive the members 27 therebetween and when so assembled in this overlapping relation, the members are provided with journal openings for the pins 29. Also, the members 27 may have projecting lugs 30 which, as shown in FIG. 7 of the drawings, will engage the cross web 31 of the members 26 thereby providing limiting stops to prevent overbending of the mold sections once they have reached their closed position.

Now, I have found that the normal weight of each end section can be substantially counterbalanced with reference to its link support and that the outer portions of said sections will be disposed so as to counteract the tendency of the center section to drop by reason of the weight of the mold in its entirety. Any nominal tendency of the glass sheets to shatter under the compressive force of the mold will thus be reduced, if not eliminated, by a novel interrelation of the mold sections, and the inherent strut-like character of the glass will be sufficient to initially sustain the mold in an open position or the end mold sections in their positions of balance. As the glass becomes properly softened and settles onto the mold, these end sections are then adapted to swing inwardly and downwardly, allowing the mold bodily to descend and, at substantially completion of the operation, carry the glass sheets so as to actually fold the end areas thereof into conformity with the mold shaping surfaces.

As previously noted, the mold per se is supported in suspended relation to the base 12 by the links 13. The links are pivotally carried at their upper ends by rods 32 extending horizontally inward from the vertically disposed posts 16 formed integrally with the side members 14 of the rack. The lower ends of each pair of oppositely disposed links 13 are provided with journal openings for receiving the ends of rods 33. The rods 33 are secured by welding or like methods to the under surfaces of the rails 22 and 23 that form the end mold sections 19 and 20. The rods 33 are thus pivotally carried by the links 13 at each end of the mold 11 and are adapted to carry the end sections so that they may be swung in a vertical plane. More particularly, the rods 33 are located transversely with reference to the longitudinally axis of the mold 11 and are adapted to carry the end sections thereof in balanced relation as they open relative to the center mold section 14 on the pin 29 of the hinges 21.

That is to say, when the end mold sections 19 and 20, swing on the hinge pins 29, they will cause the rods 33 to revolve in the journals of the links 13 and when the extreme ends or apices 24 of the said end sections are spaced apart sufficiently to equal the over-all or longest dimension of a flat glass sheet or sheets, such as the sheets 34 (FIG. 4), a counterbalance will be effected in which the component forces, tending to return the mold sections to their closed position, will be equal to or slightly less than the rigid characteristics of the glass to withstand such forces. During movement of the mold sections to this above-described open position, their lengthening, as occasioned by the outward radial movements of the end sections 19 and 20, will be compensated for by a complementary motion of the links 13 in an outward direction as described about the axes of their supporting rods 32. This will dispose the links in an out-of-plumb position and consequently an ensuing compressive force will be added to the general tendency of the mold to return, by the gravity expressed by its own weight, to the closed position.

The positioning of the rods 33 between the apices 24 of the end sections 19 and 20 and their inner ends, adjoining the ends of the central section rails 18, will thus determine the preferential balance to be obtained by the end mold sections and accordingly the extent of force that they may exert endwise across the entire mold. Obviously, if the rods 33 are located outwardly too great a distance from the axial line through the hinge pins 29, the weighted influence of the central section 17 will be of such magnitude as to increase the compressive force exerted at and against the ends of the glass sheets. By so locating the rods 33 as to establish, in the open position of the mold, a temporary counterbalance which will have a compressive force that is substantially less than the rigid character of the glass, the added force obtained by the out-of-plumb positions of the links 13 may be added to equalize the balanced condition and so provide an influential force on the glass sufficient to hold it firmly on the mold without shattering or inadvertent bending.

Each end section 19 and 20 has mounted thereon a means for initially locating a sheet or pair of sheets of glass on the mold. As shown particularly in FIGS. 2 and 6, one form of locating means may comprise a part of the convergently disposed rails 22 and 23 adjacent the apex 24 formed thereby. The upper surface 35 of a pivotally supported crotch portion 36, comprising converging rail portions 36a and 36b, in said apex 24 may thus be employed as a ledge to carry the ends of the flat sheets 34 and simultaneously serve to shape the same in and during the bending operation.

To adequately bring out this dual function of the crotch portion 36, the same is formed as a separate yet mutually shaped and related part of the rails 22 and 23 and is carried in such a manner that it will be movably in and out of line with the mold generally. The crotch portion 36 is thus carried on a shaft 37 that is journaled at its ends in uprights 38 from a platform 39. The platform 39 is fixedly secured to the under surfaces of the rails 22 and 23 and the shaft is carried by the uprights 38 so that its axis is disposed slightly above the edge to edge joint between the upper crotch portion 36 and the lower mating body portions of the rails 22 and 23. The crotch portion 36 will accordingly be swingable to locate the upper surface 35 thereof above the shaping surface generally, as the crotch portion is raised (FIG. 4), but will normally balance or remain by gravity in its interfitting relation with the rails of each end section 19 and 20 unless caused to move therefrom as when placing a sheet of glass.

To make provision for the location of sheets of glass on the surface of the crotch portions, the wings 40 thereof are provided with locator blocks 41. These blocks may be of marinite or like compositions which will neither mar nor fuse to the glass. As shown in FIG. 6, the blocks 41 are carried in brackets 42 secured to the wings 40.

Provision is also made in these end areas of the mold for controlling the ambient heat affecting the end areas of the glass. This provision is made to protect the extreme end areas since they are proportionately small in cross section and, due to the thinness of the glass, their response to requisite heating conditions for the body or central area of the sheet will obviously cause them to absorb more of the heat and literally "curl" away from the shaping surface 24, or the upper sheet to assume a greater bend than the lower sheet. For this purpose, suitable shields 43 are disposed above these end areas of the glass sheets and preferably their inwardly disposed edges are of a serrated configuration, as indicated at 44, to produce a heat gradient upon the glass. The shields 43 are pivotally carried by means of a U-shaped support 45 secured to each shield 43 across the web portion 46 and journaled on the shaft 37 at the ends of the legs 47. To properly dispose the shields at a regulated distance above the surface of the glass, a post 48 is secured to the shield in position to rest at its opposite end on the platform 39. While loading or unloading the glass sheets 34, the shields 43 are swung out of the way, as shown in phantom line in FIG. 4, and supported outwardly of the mold by a lug or stop 49 bent inwardly from one of the legs 47 and engageable by an adjacent upright 38. Later they may be returned to their shielding positions above the glass as shown in full line in the same figure.

In the present improved mold construction, the end sections 19 and 20 are oriented about the axis of rotation of the rods 33 while being moved from the closed to the open position of the mold and the location of these rods is selected so that the outwardly disposed portion of each end mold section will effect a counterbalance of sufficient magnitude that the combined weight of the inwardly disposed portion of said sections and the central mold section, acting by their natural gravity, will invoke a compressive force upon the sheets of glass located thereon which is equal to or slightly less than the strength of the glass when acting as a horizontal strut or column. In actual practice, it has been thus determined that this distribution of force will neither shatter relatively thin sheets of glass nor accelerate their bending while in a softened condition and prior to normal settling of the glass onto the shaping surface 25 of the mold. In fact, the endwise thrust of the glass remains a potential force as the links 13 are swinging inwardly toward their normal vertical positions and the mold, by gravity, is sinking toward its closed position.

However, when the major mass of the glass is disposed in satisfactory registration with the shaping surface, its softened condition is susceptible to further shaping and this is brought about by the swinging of the end mold sections 19 and 20 about the axes of the rods 33. As the mold thus completes its downward movement, the end sections thereof actually rise as their extreme ends, described by the apices 24, move upwardly and inwardly, in contrast to the downward movement of the central section 17, to direct the end areas of the glass according to the shaping surfaces in these portions of the mold. The resultant effect upon the glass is consequently of a nature which imparts a folding action and the shaping of the glass sheets into a severe and relatively deep bend resembling a broadened U shape.

In use, the shields 43 are swung to their outermost positions and the mold 11 is moved or opened into its glass receiving position when the apices 24 of the end mold sections 19 and 20 are forced outwardly and downwardly. During this action and since the longitudinal dimension of the mold is appreciably lengthened, the links 13, at the corners of the mold 11 and the rack 12, are swung toward their out-of-plumb positions to accommodate the length of the mold per se in its open position. It will be noted that during this phase of the glass loading operation, the disposition of weight of the crotch portions 36 causes them to remain substantially as parts of the end sections 19 and 20 and the shaping surface formed thereon. However, when the sheets of glass 34 are placed upon the mold with their end-most edges engaging the locator blocks 41, these crotch portions will be swung upwardly so that the glass will be supported on their surfaces or ledges 35. The rigid characteristics of the glass will now serve as a strut to counteract the compressive force of the mold and hold the same open. The shields 43 are swung about the shafts 37 to return them to their protecting positions above the end areas of the glass.

During the initial interval of the bending operation, the strut-like character of the glass sheets will restrain either the force of the links 13 or the gravity of the mold from causing the mold sections' return to the closed position. As the sheets become properly heated in the furnace, they begin to sag toward the shaping surface 25 and the central area settles onto the corresponding area of the said surface. This weakening of the glass allows the links 13 to now impose an inward thrust upon the ends of the mold and a consequent initial dropping of the mold to its closed position. In the final phase of the bending, the weight of the central mold section will further act upon the counterbalanced relation of the interconnected end sections to bring them upwardly and inwardly to complete the shaping surface and simultaneously guide the end areas of the glass in a folding action into complete registration. Also, during this period, the crotch portions 36 will swing downwardly as the strength of the glass diminishes and, by reason of their own momentum, into position to complete the shaping surface at each end of the mold.

Bending apparatus, which includes embodiments of the present invention, has thus been found to satisfactorily bend relatively long and/or thin sheets of glass which are to be bent in matched pairs and subsequently assembled into laminated units having a plastic interlayer therebetween. For this reason, an improved bending apparatus of the character herein disclosed is especially well adapted to support a pair of relatively thin sheets with little or no compressive force during the preliminary stages of the bending operation and, as the sheets become properly heated, to progressively increase the effect of a compressive force to shape the softened sheets of glass onto the shaping surface formed thereon.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In combination with apparatus for bending glass sheets into conformity with a mold shaping surface, hingedly connected mold sections movable into an open and a closed position and defining a shaping surface on the upper edges thereof, and means on the endmost sections forming a part of said shaping surface for carrying the glass sheets to be bent above the remainder of said shaping surface in the open position and movable with respect to said endmost sections and into alignment with the remainder of said shaping surface as said sheets are bent into conformity therewith.

2. In apparatus for bending glass sheets, a mold comprising a plurality of hingedly connected sections movable into an open and a closed position, each of said sections being formed of rails having a shaping surface on the upper edges thereof, means for locating and supporting a flat glass sheet to be bent above the open mold and for guiding the same as it is bent into conformity with the shaping surface of the mold when closed, comprising a portion of at least one rail of each of the endmost sections pivotally mounted with respect to the remainder of said rail and adapted to be moved into and out of conformity therewith to form in one position a continuation of the shaping surface thereof and in another position a support for the end areas of the glass sheet when flat, and means on each of said portions for locating the edges of said end areas of the glass sheet.

3. In combination with the apparatus described in claim 2, a shield carried by each of said endmost sections of the mold at a regulated distance above the shaping surface thereof and movable with said sections from the open to the closed position of the mold.

4. In apparatus for bending glass sheets, comprising a mold made up of a plurality of hingedly connected sections movable into an open and a closed position, means for mounting the endmost sections of the mold for pivotal movement about an axis located between the ends of said endmost sections, each of said sections being formed of rails having a shaping surface on the upper edges thereof, and means pivotally carried by the endmost sections for locating and supporting a flat glass sheet to be bent above the open mold and guiding the same as it is bent into conformity with the shaping surface of the mold when closed, comprising portions constituting continuations of the rails of the endmost sections when in closed position and movable out of conformity therewith when in the open position to provide a support for the end areas of the glass sheet when flat, and means on each of said portions for locating the edges of said end areas of the glass sheet.

5. In apparatus for bending glass sheets or plates, a bending mold made up of a plurality of sections, a shaping surface formed on the upper surfaces of said sections, means for hingedly connecting said sections together in end to end relationship for movement into an open and into a closed position, a support for said mold, and means for mounting at least one of the end sections of said mold on said support for pivotal movement relative thereto about an axis located adjacent a point midway between the inner hinged end and the portion of the shaping surface at the outermost end of said section.

6. In apparatus for bending glass sheets or plates, a bending mold made up of a plurality of sections, a shaping surface formed on the upper surfaces of said sections, means for hingedly connecting said sections together in end to end relationship for movement into an open and into a closed position, a support for said mold, and means for mounting at least one of the end sections of said mold on said support for pivotal movement relative thereto about an axis located between the inner hinged end and the portion of the shaping surface at the outermost end of said end section but nearer to said inner hinged end than to the shaping surface at the outermost end of said section.

7. In apparatus for bending glass sheets or plates, a periphery type bending mold made up of a plurality of rails forming sections of said mold and having a shaping surface formed on an upper face thereof, means for hingedly connecting said sections together for movement into an open and into a closed position, a support for said mold, means for mounting at least one of the end sections of said mold on said support for pivotal movement relative thereto, and means for supporting a marginal portion of a flat sheet to be bent on said mold comprising a portion fitting into the rail forming said end section adjacent to and forming a part of the shaping surface of said rail, and means for pivotally mounting said portion at its end adjacent the end of said mold.

8. In apparatus for bending glass sheets or plates, a periphery type bending mold made up of a plurality of rails forming sections of said mold including at least one wedge shaped end section and having a shaping surface formed on an upper face thereof, means for hingedly connecting said sections together for movement into an open and into a closed position, a support for said mold, means for mounting said wedge shaped end section on said support for pivotal movement relative thereto about an axis located intermediate the ends of said end section, and means for supporting the margins of an end of a flat sheet to be bent on said mold comprising wing portions fitting into the rail forming said end section at the apex thereof and adjacent to and forming part of the shaping surface of said rail, and means for pivotally mounting said wing portions adjacent the juncture thereof at the apex of said end section.

9. In apparatus for bending glass sheets or plates, a bending mold made up of a plurality of sections, a shaping surface formed on the upper surfaces of said sections, means for hingedly connecting said sections together in end to end relationship for movement into an open and into a closed position, a support for said mold, means for mounting at least one of the end sections of said mold on said support for pivotal movement about an axis located intermediate the inner hinged end and the portion of the shaping surface at the outermost end of said end section and a shield mounted adjacent said end section for bodily movement therewith and for pivotal movement into and out of shielding position above an end of a glass sheet on said mold.

10. In apparatus for bending glass sheets or plates, the combination with a frame, of a bending mold made up of a plurality of sections hingedly connected together for movement into open and closed positions within said frame, a shaping surface formed on the upper surfaces of said sections, links mounted for swinging movement on opposite sides of said frame adjacent an end section of said mold, a transverse rod extending between and mounted at its opposite ends in the free ends of said links, and means on said end section of the mold located adjacent to a point midway between the inner hinged end of said end section and the portion of the shaping surface at the outermost end of said end section for mounting said end section on said rod for pivotal movement relative thereto.

11. In apparatus for bending glass sheets or plates, the combination with a frame, of a bending mold made up of a plurality of sections hingedly connected together for movement into open and closed positions within said frame, a shaping surface formed on the upper surfaces of said sections, links mounted for swinging movement on opposite sides of said frame adjacent an end section of said mold, a transverse rod extending between and mounted at its opposite ends in the free ends of said links, and means on said end section of the mold located between the inner hinged end of said end section and the portion of the shaping surface at the outer end of said end section but nearer to said inner hinged end than to said portion of said shaping surface at the outermost end for mounting said end section on said rod for pivotal movement relative thereto.

12. In combination with apparatus for bending glass sheets into conformity with a mold shaping surface, hingedly connected mold sections movable into an open and a closed position and defining a major portion of the shaping surface on the upper edges thereof, and means associated with the endmost sections and defining on the upper edges thereof a minor portion of said shaping surface for carrying the glass sheets to be bent above said major portion of the shaping surface in the open position and movable with respect to said endmost sections to bring the upper edges of said associated means into alignment with said major portion of the shaping surface as said sheets are bent into conformity therewith.

13. A bending mold for bending flat glass sheets, comprising a plurality of shaping rail sections arranged in end to end relationship and including spaced movable flat glass sheet supporting end rail sections having their upper surfaces contoured to the desired configuration to which the glass sheet is to be bent, said flat sheet supporting rail sections comprising converging rail portions, and means mounting said movable rail sections in a first position wherein said rail portions support the undersurface of a flat glass sheet to be bent when mounted thereon and for movement to a second position wherein said movable rail sections form substantially continuations of a rail section inwardly thereof.

14. A bending mold for bending flat glass sheets having inwardly tapered end portions, comprising a plurality of shaping rail sections including spaced movable endmost rail sections, said endmost rail sections being substantially V-shaped and having their upper surfaces contoured to the desired curvature for the glass sheet to be bent and forming ledges for receiving the undersurface of the flat glass sheet to be bent, and means mounting said endmost rail sections in a first position wherein the upper surfaces of the substantially V-shaped sections support the undersurface of a flat glass sheet to be bent when mounted thereon and for movement to a second position wherein said endmost rail sections form substantial continuations of a rail section inwardly thereof.

15. A bending mold for bending glass sheets as defined in claim 13, wherein the movable rail sections are mounted for pivotal movement about axes located outwardly of the inermost ends thereof.

16. A bending mold for bending glass sheets as claimed in claim 14, wherein each endmost rail section is supported on a rail section extending inwardly thereof.

17. A bending mold for bending glass sheets as defined in claim 16, wherein the mold includes a supporting structure, and means is provided for supporting the inwardly extending rail section on the supporting structure.

References Cited in the file of this patent

UNITED STATES PATENTS

| | | |
|---|---|---|
| 2,330,349 | Galey | Sept. 28, 1943 |
| 2,348,278 | Boyles et al. | May 9, 1944 |
| 2,377,849 | Binkert et al. | June 12, 1945 |
| 2,450,297 | Pearse et al. | Sept. 28, 1948 |
| 2,486,153 | Gwyn | Oct. 25, 1949 |
| 2,518,951 | Smith | Aug. 15, 1950 |
| 2,551,607 | Jendrisak | May 8, 1951 |
| 2,554,572 | Jendrisak | May 29, 1951 |
| 2,608,799 | Babcock | Sept. 2, 1952 |

Dedication 3,094,403.—*Joseph B. Jendrisak*, Northville, Mich. GLASS SHEET BENDING MOLD. Patent dated June 18, 1963. Dedication filed Nov. 28, 1973, by the assignee, *Libbey-Owens-Ford Company*.

Hereby dedicates to the Public the entire remaining term of said patent.

[*Official Gazette March 12, 1974.*]